Jan. 15, 1946.  T. R. GRIFFIN  2,393,219
LAUNDRY-PROOF FASTENER
Filed Aug. 24, 1943
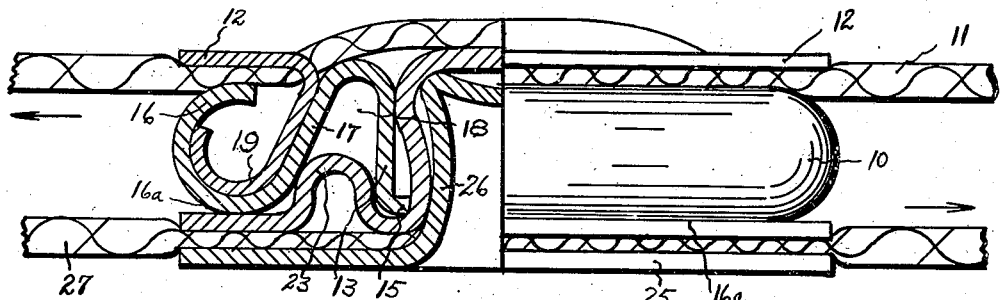
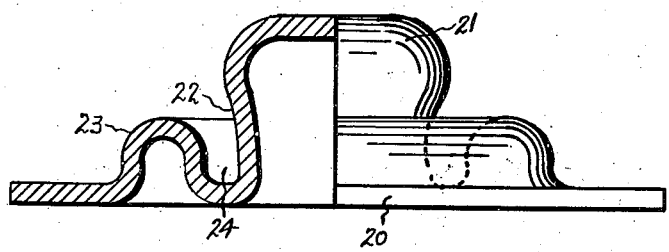
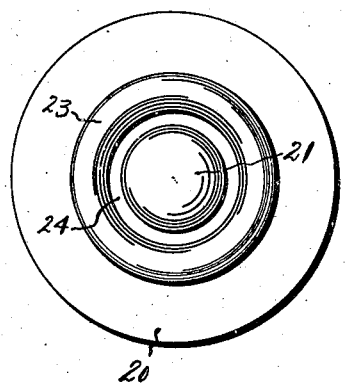
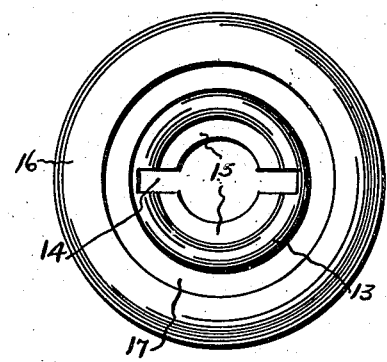
Inventor
*Theodore R. Griffin.*
By *Walter S. Jones*
Attorney Patented Jan. 15, 1946

2,393,219

UNITED STATES PATENT OFFICE 2,393,219

LAUNDRYPROOF FASTENER

Theodore R. Griffin, Belmont, Mass., assignor to United Carr Fastener Corporation, Cambridge, Mass., a corporation of Massachusetts Application August 24, 1943, Serial No. 499,868

1 Claim. (Cl. 24—219)

The present invention relates to snap fastener assemblies of the type comprising complemental stud and socket members, and more particularly to a stud member for use in a laundry-proof fastener, and the invention aims generally to improve existing stud members therefor.

One of the principal aims and objects of the invention is to provide a stud member of such strong and durable construction that it may be affixed to a garment or other article of launderable nature capable of withstanding the heavy pressures which are normally incurred in laundering garments.

A further object of the invention is to provide an improved construction of stud member adapted to cooperate with a socket member of the type having an annular series of resilient fingers defining a resilient stud-receiving socket and a surrounding retainer ring connected to the inner ends of the fingers by a sloping anvil portion defining an annular trough between said anvil and fingers, the stud member being provided with integral means positioned in the annular trough outwardly of the resilient fingers to reinforce the latter against over-expansion such as would disengage the stud member from the socket when the cooperating members of the fastener are subjected to relative lateral strain.

A further object of the invention is to provide an improved stud member of the above described character which, because of its extremely simple construction, may be manufactured very inexpensively.

The above and other aims and objects of the invention will be apparent from a consideration of the accompanying drawing and annexed specification illustrating and describing the preferred embodiment of the invention.

In the drawing:

Fig. 1 is an enlarged sectional elevation of a snap fastener assembly embodying my improved form of stud member;

Fig. 2 is an enlarged sectional elevation of the stud member;

Fig. 3 is a top plan view of the stud; and

Fig. 4 is a top plan view of the socket.

Referring to the embodiment of the invention illustrated in the drawing, Fig. 1 shows a snap fastener installation comprising a conventional form of socket member 10 affixed to a fabric-supporting sheet 11 by suitable means, as for example a clinch ring 12. In this figure the supporting sheet may comprise one or more layers of fabric material which may be hemmed portions formed along the overlapping edges of the garment of a launderable nature.

As stated, the socket member may be of a conventional construction comprising a central wall 13 of generally cylindrical proportions which has been axially slitted as at 14 (Fig. 4) at a number of points to form a plurality of resilient fingers 15 inwardly rolled along its free ends to provide each of these fingers with a stud-engaging bead. The socket member advantageously includes an integral retainer ring 16 connected to the fingers by a sloping wall 17 with a substantially V-shaped annular trough 18 between the sloping wall 17 and central wall 13. The socket element 10 may be advantageously secured to its fabric-supporting sheet 11 by any suitable means, for example a socket clinch plate comprising an annular ring 12 having a plurality of prongs 19 which are forced through the fabric sheet 11 and into engagement with the sloping outer surface of the wall 17 which turns them inwardly into locked engagement with the retainer ring 16. Preferably the outer edge 16ᵃ of the retainer ring is beyond the beaded ends of the fingers 15 so as to protect the latter against crushing in mangles or the like when laundering the garment. This type of socket member per se is of known construction and is here shown merely as illustrative of a preferred type of socket with which my improved stud member may be used.

My improved stud member is preferably formed from a single piece of material, such as metal, and comprises a base or plate portion 20 having a central bulbous head 21 and a restricted neck 22 defining a stud adapted for snap fastener engagement with the resilient fingers 15 forming the socket of the socket member as is usual with such fasteners.

In order to reinforce the resilient socket element formed by the resilient fingers 15 against over-expansion and consequent separation of the engaged stud and socket members when subjected to relative lateral strain, as for example by a lateral pull applied to the members in planes at right angles to the central axis of the stud and socket, I provide integral means on the stud for reinforcing the socket against over-expansion during such times as the plate portion 20 of the stud substantially engages the outer edge 16ᵃ of the retainer ring.

This is accomplished advantageously, as in the illustrated embodiment of the invention, by forming on said plate an annular ring 23 of inverted U-shaped cross-section as viewed when the head 21 of the stud is uppermost, as shown in Fig. 2. This ring 23 surrounds the head 21 in spaced relation thereto providing an annular trough 24 for the reception of the resilient fingers 15 forming the socket element. Preferably the ring extends outwardly from the plate portion 20 a suitable distance beyond the reduced neck 22, so that when the stud and socket members are in assembled snap fastened engagement as shown in Fig. 1, the ring 23 will be positioned in the V-shaped trough 18 of the socket member with the spaced side walls of the ring 23 engaging or positioned close to the fingers 15 and sloping wall 17 inwardly of the terminal ends of the socket fingers.

The stud member may be attached to its fabric-supporting sheet 27 by any suitable means commonly employed for securing stud fasteners to a support. In the form herein illustrated the stud member may be affixed to its supporting sheet by means of an eyelet having a plate 25 engaging the opposite faces of the sheet 27 and a tubular eyelet 26 passed through the sheet 27 and into the interior of the head in which it is expanded as a result of pressure to clamp the stud and eyelet together, as is well known in the art.

With the stud and socket member in cooperative snap fastener engagement as shown in Fig. 1, it will be seen that the ring 23 is positioned in the V-shaped trough 18 of the socket with the walls of the ring so close to the fingers 15 and wall 17 of the socket as to prevent over-expansion and consequent separation of the fastener parts when subjected to relative lateral strain in the direction of the arrows. This, however, does not hinder the engagement and disengagement of the stud and socket members upon substantial axial movement.

I am aware that heretofore it has been proposed to reinforce the resilient fingers of the socket member of laundry-proof fasteners but, insofar as I am aware, such reinforcement has been by means of a separate plate member attached to and facing a part of the socket member and involves construction more complicated and costly than the fastener employing my improved stud member.

Although I have illustrated and described a preferred form of my invention, I do not wish to be limited thereby because the scope of my invention is best defined by the following claim.

I claim:

In a snap fastener assembly, a stud member comprising a plate and an integral bulbous head adapted to be positioned in and engaged with an annular series of resilient fingers defining a stud-receiving socket of a cooperating socket member, said stud member having an integral annular rim extending from said base intermediate said head and outer edge thereof and providing a retainer ring for said resilient socket fingers against over-expansion when the stud and socket members are subjected to relative lateral strain.

THEODORE R. GRIFFIN.